(12) United States Patent
Te Velde et al.

(10) Patent No.: US 11,006,781 B2
(45) Date of Patent: May 18, 2021

(54) COOKER

(71) Applicant: KONINKLIJKE PHILIPS N.V., Eindhoven (NL)

(72) Inventors: Mart Kornelis-Jan Te Velde, Eindhoven (NL); Robertus Leonardus Maria In 'T Groen, Eindhoven (NL); Michiel De Jong, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 297 days.

(21) Appl. No.: 16/086,136

(22) PCT Filed: Mar. 16, 2017

(86) PCT No.: PCT/EP2017/056185
§ 371 (c)(1),
(2) Date: Sep. 18, 2018

(87) PCT Pub. No.: WO2017/158068
PCT Pub. Date: Sep. 21, 2017

(65) Prior Publication Data
US 2019/0110640 A1    Apr. 18, 2019

(30) Foreign Application Priority Data

Mar. 18, 2016  (EP) .................................. 16161081

(51) Int. Cl.
*A47J 37/06*   (2006.01)
*F24C 15/32*   (2006.01)
*F24C 15/00*   (2006.01)

(52) U.S. Cl.
CPC ......... *A47J 37/0641* (2013.01); *F24C 15/003* (2013.01); *F24C 15/327* (2013.01)

(58) Field of Classification Search
None
See application file for complete search history.

(56) References Cited

U.S. PATENT DOCUMENTS

| 3,713,401 A |   | 1/1973  | McClurkin |             |
|-------------|---|---------|-----------|-------------|
| 3,758,987 A | * | 9/1973  | Crane, Jr. | A01G 27/003 |
|             |   |         |           | 47/80       |
| 4,366,030 A | * | 12/1982 | Anderson  | B01D 1/0094 |
|             |   |         |           | 202/196     |

(Continued)

FOREIGN PATENT DOCUMENTS

| AU |    797166 A | 1/1969  |
|----|-------------|---------|
| CN | 104146190 A | 11/2014 |

(Continued)

*Primary Examiner* — Ibrahime A Abraham
*Assistant Examiner* — Gyounghyun Bae (57) ABSTRACT

According to the present invention, there is provided an air-frying cooker (1) comprising: a cooking chamber (20); a food receiving container (5) in the cooking chamber (20) having a permeable bottom wall (9); a heater (19) for heating air in the cooking chamber (20); a fan (18) for circulating a flow of hot air in the cooking chamber (20) to cook the food; and a system (13) to maintain a predetermined level (LI) of water in the cooking chamber (20) during cooking. The predetermined level (LI) is disposed between a base (11) of the cooking chamber (20) and the bottom wall (9) of the food container (5).

17 Claims, 3 Drawing Sheets

(56) References Cited

U.S. PATENT DOCUMENTS

| | | | | |
|---|---|---|---|---|
| 4,426,923 A * | 1/1984 | Ohata | A47J 39/003 | 126/20 |
| 4,509,412 A * | 4/1985 | Whittenburg | A47J 27/04 | 126/20 |
| 4,655,192 A * | 4/1987 | Jovanovic | A47J 27/04 | 126/20 |
| 5,049,713 A * | 9/1991 | Creyaufmuller | A47J 31/547 | 219/689 |
| 5,649,476 A * | 7/1997 | Montagnino | A47J 27/04 | 122/31.1 |
| 6,602,530 B1 * | 8/2003 | Weber | A47J 27/04 | 126/369 |
| 6,742,442 B1 * | 6/2004 | Su | A47J 31/12 | 99/281 |
| 7,878,702 B2 * | 2/2011 | Peng | A47J 27/004 | 366/145 |
| 8,474,407 B2 * | 7/2013 | Chumbley | A01K 39/026 | 119/77 |
| 2002/0070153 A1 * | 6/2002 | Bowler | C02F 9/005 | 210/245 |
| 2003/0029498 A1 * | 2/2003 | King | B01F 5/0496 | 137/268 |
| 2004/0088781 A1 * | 5/2004 | Suffa | E03D 9/032 | 4/227.1 |
| 2006/0005775 A1 * | 1/2006 | Ritchey | A01K 5/0142 | 119/61.5 |
| 2008/0163757 A1 * | 7/2008 | Jeon | F24C 15/327 | 99/330 |
| 2008/0236404 A1 * | 10/2008 | Ose | F24C 7/08 | 99/327 |
| 2009/0288342 A1 * | 11/2009 | Hui | A01G 27/006 | 47/79 |

FOREIGN PATENT DOCUMENTS

| | | |
|---|---|---|
| CN | 204427799 * | 7/2015 |
| EP | 0277337 A2 | 8/1988 |
| EP | 1955621 A1 | 8/2008 |
| EP | 2050373 A1 | 4/2009 |
| GB | 2157550 A | 10/1985 |
| JP | 2015105773 A | 6/2015 |
| NL | 1006282 C2 | 12/1998 |

* cited by examiner

COOKER

This application is the U.S. National Phase application under 35 U.S.C. § 371 of International Application No. PCT/EP2017/056185, filed on Mar. 16, 2017, which claims the benefit of International Application No. 16161081.1 filed on Mar. 18, 2016. These applications are hereby incorporated by reference herein.

FIELD OF THE INVENTION

The present invention relates to a cooker, more particularly a cooker that uses steam during the cooking process, for instance an air-frying cooker.

BACKGROUND OF THE INVENTION

An air frying cooker uses heated air accelerated to a high velocity to cook food. The high velocity air causes a high rate of heat transfer from the air to the food relative to a typical fan oven. A particular feature of an air-frying cooker is that it circulates air around the food to evenly heat it from all sides. This produces results not dissimilar to pan frying or deep frying but with substantially less fat content in the food as little or no oil is required.

The cooking process can be improved further by adding water to the air frying cooker so that the water evaporates to create steam. Steam is much more effective at transferring heat than air and so a steam environment in the air frying cooker results in faster cooking times and higher surface temperatures of the food which provides an improved crispy texture and, when cooking meat, greater fat reduction.

A steam environment introduces the problem of ensuring that a continuous supply of water for evaporation is maintained.

SUMMARY OF THE INVENTION

It is an object of the invention to provide a cooker which substantially alleviates or overcomes one or more of the problems mentioned above.

The invention is defined by the independent claims. The dependent claims define advantageous embodiments.

According to the present invention, there is provided a cooker comprising: a cooking chamber; a food receiving container in the cooking chamber having a permeable bottom wall; and a system to maintain a predetermined level of water in the cooking chamber said water being added to the cooker during cooking to create steam, wherein the predetermined level is disposed between a base of the cooking chamber and the bottom wall of the food container.

During operation of the cooker the system acts to maintain the water level in the bottom of the cooking chamber as it is evaporated to allow steam to be continuously generated.

Advantageously, the system comprises: a reservoir in fluid communication with the cooking chamber and configured to retain water at a higher level than the predetermined level by vacuum pressure; and an opening to the reservoir configured so that air may pass into the reservoir when the water level in the cooking chamber drops below the predetermined level to increase the pressure acting on the water in the reservoir and displace water from the reservoir into the cooking chamber until the water level in the cooking chamber is restored to the predetermined level.

The system acts to maintain the water level in the bottom of the cooking chamber as it is evaporated is purely mechanical, that is to say, it doesn't require any electronic sensing.

Advantageously, in one embodiment, the opening to the reservoir is disposed in a wall of the cooking chamber at the predetermined level so that, when water in the cooking chamber drops below the predetermined level, air above the water in the cooking chamber passes into the reservoir through the opening to increase the pressure acting on the water in the reservoir and displace water from the reservoir into the cooking chamber until the water level in the cooking chamber is restored to the predetermined level.

Therefore the water level is maintained in the cooking chamber irrespective of evaporation of the water in the cooking chamber during cooking.

Preferably, in other embodiments, the system to maintain a predetermined level of water comprises a reservoir that includes a tank configured to retain water at a level higher than the predetermined level due to vacuum pressure acting on water contained in the tank, a breather in fluid communication with the tank, wherein the reservoir is in fluid communication with the cooking chamber below the predetermined level, and the cooking chamber and the breather are configured so that changes in water level in the cooking chamber are reflected in changes in water level in the breather, and wherein the reservoir is adapted so that air can pass through the opening into the tank from the breather when the water level in the cooking chamber drops below the predetermined level to increase the pressure acting on the water in the tank and displace water from the reservoir into the cooking chamber until the water level in the cooking chamber is restored to the predetermined level.

The breather allows air from outside the cooking chamber to displace water from the reservoir. This is advantageous when the cooking chamber has a high steam ratio, or high steam level.

Advantageously, the breather is an open-ended pipe which is shaped so that air passes from the pipe into the tank when the water level in the pipe drops below said predetermined water level.

Therefore, by use of a pipe to provide the breather, the system has a simple construction.

Advantageously, the reservoir comprises a divider to partition the reservoir into the breather and the tank.

Preferably, the reservoir has a base wall and a lower end of the divider terminates above the base wall at the predetermined water level to provide said fluid communication between the breather and the tank.

Advantageously, the breather is a pipe having an open end, the pipe being received in the tank such that said open-end is at the predetermined level, and the water level in the breather extends across said open end of the pipe when water level in the breather and the cooking chamber is at the predetermined level such that, when the water level in the cooking chamber drops below said predetermined level, air passes into the tank from said open end to displace water from the tank into the cooking chamber to restore the water level in the cooking chamber to the predetermined level.

Therefore the breather is simply formed.

Advantageously, the breather comprises a first conduit and the tank comprises a second conduit, the first and second conduits extending into the cooking chamber to a location below the predetermined water level, each of said first and second conduits being configured so that, when the water in the cooking chamber drops below the predetermined level, air passes from the first conduit into the second conduit to displace water from the tank into the cooking chamber via the second conduit.

Preferably, the system includes an intermediate wall between the first and second conduits that terminates in the cooking chamber at the predetermined water level so that air flows across the end of said intermediate wall from the first conduit into the second conduit when the water level in the cooking chamber drops below the predetermined water level.

Advantageously, a duct is provided to regulate the pressure in the cooking chamber.

Advantageously, the cooking chamber comprises: an upper enclosure; an outer pan positionable beneath the upper enclosure; and a sealing element disposed between the upper enclosure and the outer pan to form a seal between the upper enclosure and the outer pan when the outer pan is disposed beneath the upper enclosure.

The sealing element forms a seal between the upper enclosure and the outer pan to prevent air from outside the cooking chamber from leaking into the cooking chamber to displace steam so that a high humidity level can be achieved.

Advantageously, the sealing element comprises a resilient flexible seal that is compressed between the upper enclosure and the outer pan when the when the outer pan is positioned beneath the upper enclosure.

Advantageously, a sealing member is provided to create to seal the tank above the water contained in the tank and thereby maintain vacuum pressure acting on the water contained into the tank.

Advantageously, a valve is provided between the reservoir and the cooking chamber.

Therefore, the reservoir can be filled with water without water draining directly into the cooking chamber so that the water level in the reservoir can be filled to a higher level than the level of water in the cooking chamber.

Advantageously, the duct comprises a restriction to maintain a pressure greater than atmospheric pressure in the cooking chamber.

The sealing performance of the seal is enhanced by maintaining a pressure slightly above atmospheric pressure.

In accordance with any of the preferred embodiments of the invention, the sealing element may comprise a resilient flexible seal that is compressed between the cover and the cooking chamber when the cover is positioned on the cooking chamber.

In preferred embodiments, the cooker is configured so that the predetermined level (L1) is 0.1-1.5 cm from the base of the cooking chamber. Only a relatively thin layer of water needs to be maintained in the cooking chamber for the purpose of steam generation.

In one embodiment, the cooker may be an air-frying cooker, further comprising a heater for heating air in the cooking chamber; and a fan for circulating a flow of hot air in the cooking chamber to cook the food. During operation of the air-frying cooker, the circulating flow of hot air can evaporate water in the cooking chamber to generate steam. In other words, the heater and fan of the air-frying cooker may be used to generate steam, without the need for an additional heater.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

According to an embodiment of the present invention, there is provided an air-frying cooker 1 comprising: a cooking chamber 20; a food receiving container 5 in the cooking chamber 20 having a penetrable bottom wall 9; a heater 19 for heating air in the cooking chamber 20; a fan 18 for circulating a flow of hot air in the cooking chamber 20 to cook the food 8; and a system 13 to maintain a predetermined level L1 of water in the cooking chamber 20 during cooking. The predetermined level L1 is disposed between a base 11 the cooking chamber 20 and the bottom wall 9 of the food container 5.

According to embodiments of the invention, the system 13 comprises: a reservoir 22 in fluid communication with the cooking chamber 20 and configured to retain water at a higher level than the predetermined level L1 by vacuum pressure; and an opening 33, 36, 40, 50, 60 to the reservoir 22 configured so that air may pass into the reservoir 22 when the water level in the cooking chamber 20 drops below the predetermined level L1 to increase the pressure acting on the water in the reservoir 22 and displace water from the reservoir 22 into the cooking chamber 20 until the water level in the cooking chamber 20 is restored to the predetermined level L1.

Figure 1:
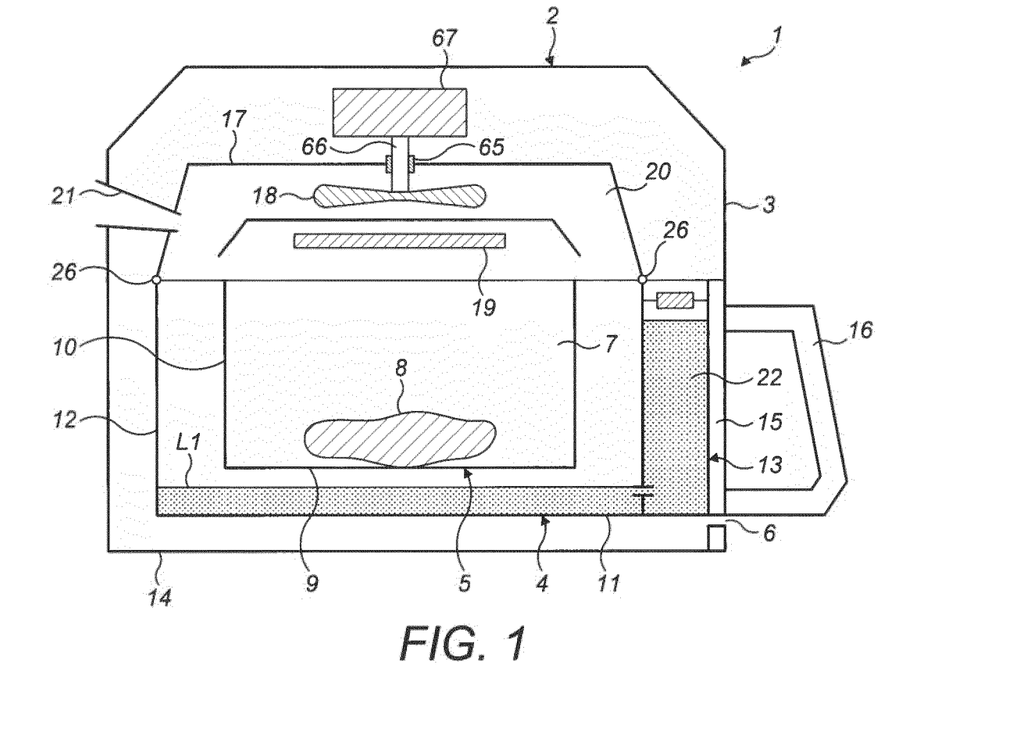
FIG. 1 shows a cross sectional schematic of a cooker, in particular an air-frying cooker.

Referring now to FIG. 1, a cross sectional schematic of an air-frying cooker is shown. The air-frying cooker 1 comprises an outer housing 2 having a wall 3 that defines sides of the outer housing 2.

The air-frying cooker 1 further comprises an outer pan 4 and a food container or basket 5. The food container 5 is received within the outer pan 4 and both are received within the housing 2 through an opening 6 provided in the wall 3 of the housing 2.

The food container 5 has a base 9 and a side wall 10 and defines a food receiving space 7 into which a food article 8 to be cooked is placed prior to cooking. The food container 5 may be fluid permeable and be made from, for example, a wire mesh.

The outer pan 4 is impermeable and comprises a base 11 and a wall 12 upstanding around edges of the base 11 to provide a space for receiving the food container 5. The outer pan 4 is bigger in every dimension than the food container 5 and the food container 5 is supported above the outer pan 4 base 11 on supports (not shown) to provide a space between respective food container 5 and outer pan 4 bases 9, 11 and side walls 10, 12. The outer pan 4 and the food container 5 are removable from the outer housing 2 through the opening 6 in the outer housing 2. The outer pan 4 and the food container 5 may be removable by a sliding action. For example, the outer pan 4 may rest on a base part 14 of the housing 2 and slide along the base 14 during its removal from the outer housing 2. A portion 15 of the wall 12 of the outer pan 4 is shaped to present a generally flush exterior of the housing 2 when it is received in the opening 6. A handle 16 is provided on said portion 15 of the wall 12 so that a user can slide the outer pan 4 into and out of the opening 6 as required.

Also internal to the outer housing is an upper enclosure 17 arranged around a fan 18 for circulating heating fluid and a heater 19 for heating the fluid as it is circulated. When the outer pan 4 is disposed within the housing 2 it locates beneath the upper enclosure 17 so that said enclosure 17 extends across upper edges of the wall 12 of the outer pan 4 to form the cooking chamber 20 around which heated air is circulated during operation of the air-frying cooker 1.

During use of the air-frying cooker 1 the outer pan 4 is removed from the outer housing 2 so that food can be introduced into the food container 5. The outer pan 4 is then filled with water to a predetermined level L1 and inserted back into the outer housing 2. The predetermined level is disposed between the base 11 of the outer pan 4 and the base 9 of the food container 5 and is as thin as possible from the base 11 of the outer pan 4, as only a thin layer of water at the bottom of the outer pan 4 is required for steaming. The predetermined level is preferably in the range of 0.1-1.5 cm from the base 11 of the outer pan 4. More preferably, the predetermined level is in the range of 0.1-0.7 cm from the base of the outer pan 4. The distance of the predetermined level L1 from the base 11 of the outer pan 4 may be different, although it is important that the predetermined level L1 is not such that it is higher the base 9 of the food container 5 when the food container 5 is received in the cooking chamber 20.

The predetermined level L1 is thin so that the water mass can be quickly heated. Upon start-up of the air-frying cooker 1, hot air is circulated around the cooking chamber 20 to transfer heat to the water so that it begins to generate steam. The hot air is circulated at high velocity and allows for a high rate of heat transfer to the water and therefore a high rate of steam generation, relative to a conventional oven.

A sealing element 26 is provided between the outer pan 4 and the upper enclosure 17 to form a seal between the outer pan 4 and the upper enclosure 17 when the outer pan (4) is disposed beneath the upper enclosure (17). The sealing element 26 may be disposed either along the upper edge of the wall 12 of the outer pan 4 or along a lower edge of the upper enclosure 17.

The fan 18 is mechanically coupled to an electric motor 67 disposed externally to the cooking chamber 20 by a drive shaft 66. The drive shaft 66 extends through an opening in the upper enclosure 17. Optionally, an additional seal 65 is provided around the drive shaft 66 to prevent air leaking into the cooking chamber 20 through any gap in the opening around the drive shaft 66 that may exist due to general manufacturing tolerances.

A duct 21 extends from the outside of the housing 2 through the upper enclosure 17 so as to communicate with the cooking chamber 20. The duct 21 provides a channel for heated air and steam to exit the cooking chamber 20 and ensures that it is kept at near constant pressure as heat is added during operation of the air-frying cooker 1.

The sealing element 26 prevents air from outside the cooking chamber 20 from leaking into the cooking chamber 20 during operation of the air-frying cooker 1. Therefore less heat energy is required to maintain temperature within the cooking chamber 20 as less of the heated air and steam within the cooking chamber 20 is exchanged with cooler air from outside the cooking chamber 20.

The duct 21 may be provided with a restriction (not shown) to restrict the flow of steam and heated air from the cooking chamber 20 and maintain a slight over pressure within the cooking chamber 20, that is, a pressure that is slightly over atmospheric pressure. In a preferred embodiment of the invention, the restriction is configured so that the pressure in the cooking chamber 20 is 0.0005 bar gauge. The advantage of this over pressure is that the sealing performance of the seal 26 is improved so that is has the effect of further reducing the leakage of air from outside the cooking chamber 20 into the cooking chamber 20.

After a time post start-up, the environment within the cooking chamber 20 is near 100% steam, or 0% air. This is a result of the displacement of the air through the duct 21 as steam is generated and is made possible by the sealing element 26 which prevents air from outside the cooking chamber 20 from entering the cooking chamber 20. A high percentage steam environment produces a number of advantages, the primary advantage being that it decreases the drying rate of food compared to an air environment. When cooking meat this results in more juice being retained in the meat. Providing a steam environment also allows vegetables to be cooked in the air frying cooker, as otherwise the results would be undesirable due to burning. Cooking in a 100% steam environment is also faster as drying has a cooling effect. Another advantage is the preservation of antioxidants in food as without air present in the cooking chamber 20 there is little to no oxygen available to react with the antioxidants.

According to an embodiment of the invention, the system 13 to maintain a predetermined level L1 of water in the cooking chamber 20 includes a water reservoir 22 in fluid communication with the outer pan 4 of the cooking chamber 20. The water reservoir 22 may be disposed between the outer pan 4 and the handle 16 so that the reservoir 22 is removed with the outer pan 4 when the outer pan 4 is removed from the air-frying cooker 1.

During operation of the air-frying cooker, the water reservoir 22 is configured to automatically maintain the predetermined level L1 of water in the bottom of the cooking chamber 20 as it is depleted with the generation of steam.

Figure 2:
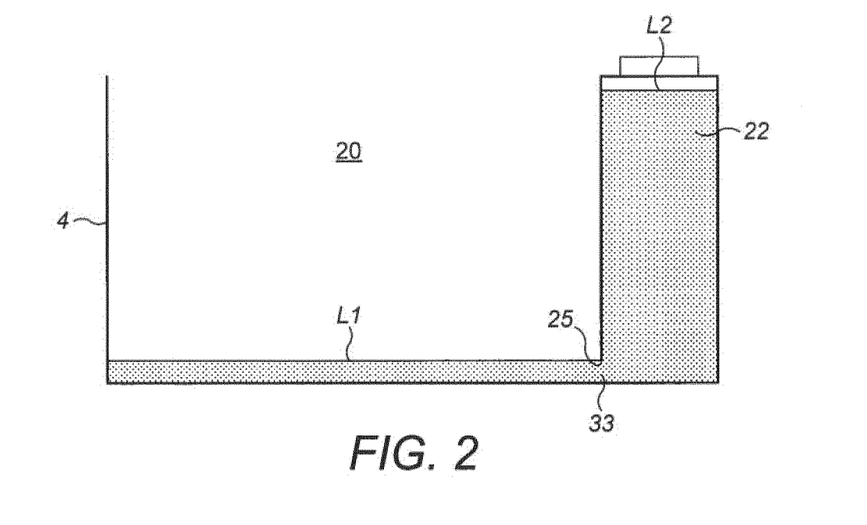
FIG. 2 shows a schematic water level controller according to a first embodiment of the invention.

FIG. 2 shows a first embodiment of system 13. The system 13 comprises a water reservoir 22 in fluid communication with the cooking chamber 20, for simplification the upper enclosure 17, fan 18 and heater 19 are not shown. The water reservoir 22 is configured to retain water at a higher level L2 than the predetermined level L1 of water in the bottom of the cooking chamber 20 for steam generation, the water level difference being maintained by a vacuum pressure above the water in the reservoir 22. The water reservoir 22 is disposed adjoining the cooking chamber 20 so that the water reservoir 22 and the cooking chamber 20 share a common wall. An opening 33 is provided in the common wall so that the reservoir 22 is in fluid communication with the cooking chamber 20. An upper edge 25 of the opening is coincident with the predetermined level L1, in other words it is coincident with the desired water level in the bottom of the cooking chamber 20. Therefore, if the required predetermined level L1 is 1 cm, then the upper edge 25 of the opening may be 1 cm from the base 11 of the outer pan 4.

It shall be appreciated that the difference in water level between the reservoir 22 and the cooking chamber 20 is maintained by a pressure difference at the respective surfaces of the water in the reservoir 22 and the cooking chamber 20. The pressure at the surface of the water in the reservoir 22 is a vacuum pressure, that is, it is less than atmospheric pressure. The pressure at the surface of the water in the cooking chamber 20 is atmospheric pressure or slightly greater. The water level difference is the result of hydrostatic equilibrium at the opening 33 between the cooking chamber 20 and the reservoir 22. Therefore, if the water level in the cooking chamber 20 drops below the level of the upper edge 25 of the opening due to, for example, evaporation during cooking, fluid from the cooking chamber 20 will bubble up into the reservoir 22 to increase the pressure at the surface. So that the hydrostatic pressures at the opening 33 are equalized, water from the reservoir 22 will be displaced into the cooking chamber 20 restoring the water level in the cooking chamber 20 to the predetermined level L1. By this process the water level in the cooking chamber 20 is maintained at the height of the upper edge 25 of the opening and, therefore, the predetermined level L1.

This process becomes less effective when the fluid in the cooking chamber 20 is a high percentage of steam, such as near 100% steam. This is because the bubble that forms in the reservoir will be a steam bubble which will condense in the water of the reservoir 22 and disappear before it reaches the surface.

Embodiments of the invention are shown in FIGS. 3 to 6 in which the system 13 is configured to maintain water in the cooking chamber 20 (for simplification the upper enclosure 17, fan 18 and heater 19 are not shown) at the predetermined level L1 when the fluid in the cooking chamber 20 is a high percentage of steam. In these embodiments the reservoir 22 is fluidly connected to the cooking chamber 20 below the predetermined level L1, and the reservoir 22 comprises a tank 23 to retain water at a higher level L2 than the predetermined level L1, and a breather 24.

The breather 24 is configured to provide a space 51 within the reservoir 22 that is open to atmosphere. As discussed above with reference to FIG. 1, the pressure in the cooking chamber 20 above the surface of the water is maintained at a pressure just above atmospheric pressure by the duct 21. Therefore, as a result of the fluid connection between the cooking chamber 20 and the reservoir 22, the water level in the cooking chamber 20 and the space 51 within the reservoir open to atmosphere will be substantially the same. It shall be understood that, the water level in the space 51 open to atmosphere will be very slightly higher than the water level in the cooking chamber 20 due to the marginal pressure difference, however in this application both levels will be referred to as the predetermined level L1.

The breather 24 portion defines an air path into the tank 23 that is blocked when the water in said space 51 in the reservoir open to atmosphere is at the predetermined level L1. When the water level in the cooking chamber 20 and said space 51 in the reservoir open to atmosphere drops below the predetermined level L1 the air path is unblocked so that air is drawn into the tank 23 to displace water from the tank 23 into the cooking chamber 20.

Figure 3:
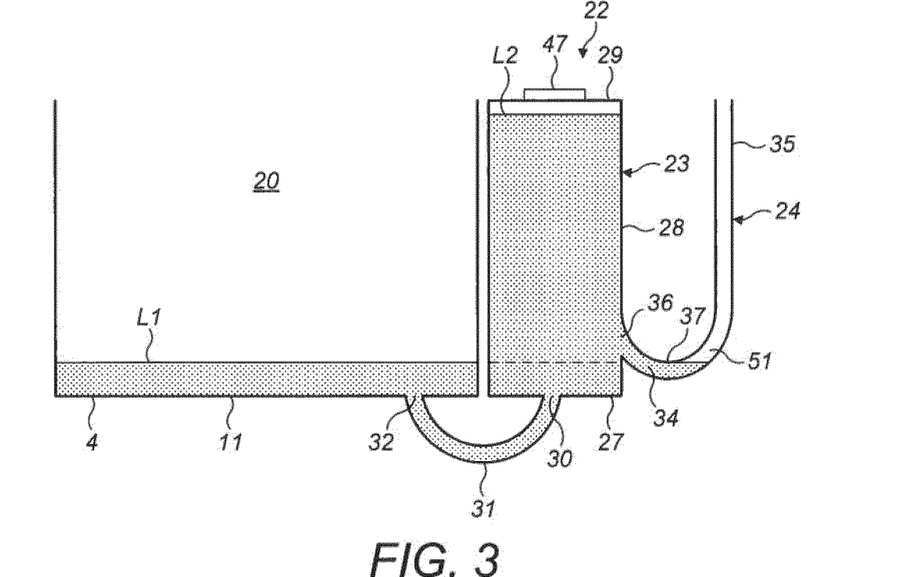
FIG. 3 shows a schematic water level controller according to a second embodiment of the invention.

In a second embodiment of the invention shown in FIG. 3, the tank 23 comprises a base 27 and a wall 28 upstanding around the base 27 to form the sides of the tank 23, a top wall 29 extends across upper edges of the wall 28 to enclose the tank 23 at its top end. An opening 30 is provided in the bottom of the tank 23 which is connected by a channel 31 that extends from the opening 30 in the tank 23 to a corresponding opening 32 in the base 11 of the cooking chamber 20 to fluidly connect the cooking chamber 20 to the tank 23.

An opening is provided in the top wall 29 of the tank 23 through which the tank 23 can be filled with water. The opening is sealable by any conventional means. For example a screw cap 47 could be used to seal the tank 23, wherein the tank 23 comprises a corresponding threaded section around the opening for the screw cap 47 to attach to. Alternatively, the opening may be a plain opening and a rubber or polymer bung is provided to insert into the opening to seal the opening.

A valve (not shown) is provided at the opening 30 in the base 27 of the tank 23 to close the tank 23 off from the channel 31 and allow the tank 23 to be filled with water without the water passing through the channel 31 and into the cooking chamber 20.

In this embodiment the breather 24 is an open ended pipe in fluid communication with the airtight tank 23 via opening 36. The open-ended pipe is shaped so that air passes from the pipe into the tank 23 when the water level in the pipe drops below the predetermined water level L1.

The pipe may extend along a substantially U shaped or V shaped path. In particular, the pipe may have a first section 34 that extends down and away from the wall 28 of the airtight tank 23 to a lower end 37, and a second section 35 that extends up from the lower end 37 of the pipe. The second section 35 being open to atmosphere so that the level of the water in the second section 35 assumes the same level as water in the cooking chamber 20, while the lower end 37 of the pipe is disposed at the predetermined level L1 so that when water in the cooking chamber 20 and the second section of pipe 35 is at or above the predetermined level L1, the air path along the first section 34 is blocked, that is to say, air is prevented from bubbling up the first section 34 by the water in the second section 35.

In the illustrated embodiment, the pipe extends away from the wall 28 of the tank 23 along a substantially parabolic path. It can be seen that the lower end 37 of the first section 34 of pipe is a turning point in the parabolic path. The second section 35 extends away from the turning point upwards along the parabolic path and into an upstanding straight section 35.

Prior to heating the cooking chamber 20, it is filled with water to a first level that is just below the predetermined level L1. The valve is then closed to prevent water travelling along the channel 31 and the tank 23 is filled to a level L2 higher than the predetermined level L1 via the opening in the top wall 29 so that it is full or as near as full as possible. It shall be appreciated that as the tank 23 is filled the breather 24 will also fill with water so that water in the breather 24 is at the same level L2 as the water in the tank 23. For this reason the straight section 35 extends to a level at least equal to the level to which the tank 23 is filled. The tank 23 is then sealed by screw cap 47 or bung as described above and the valve is then opened so that residual water in the breather 24 drains into the cooking chamber 20 through the channel 31 until the level of water in the breather 24 is the same as the level in the cooking chamber 20, which is the predetermined level L1. The predetermined level L1 is coincident with the turning point of the parabolic section 34 so that the air path into the tank 23 defined by the breather 24 is blocked by the presence of water. Other methods of priming the system ready for use are also envisaged.

As the water in the cooking chamber 20 is evaporated to steam the water level is maintained at the predetermined level L1 by the following technique and principles. A drop in the water level in the cooking chamber 20 causes a drop in the water level of the water in the breather 24. Therefore the water in the breather 24 drops away from the turning point at the lower end 37 of the pipe to define an air path into the tank 23. In other words, air from the breather 24 can bubble up around the lower end 37 of the pipe and into the tank 23 as a result of the drop in the water level. This in turn causes a rise in the water level as follows: air introduced into the tank 23 increases the pressure at the surface of the water in the tank 23 to displace water from the tank 23 into the cooking chamber 20 so that hydrostatic equilibrium is maintained between the cooking chamber 20 and the tank 23. This process continues until the water level is restored to the predetermined level L1 when the air path into the tank 23 is again blocked by the presence of water in the parabolic section 34 of the breather 24.

Figure 4:
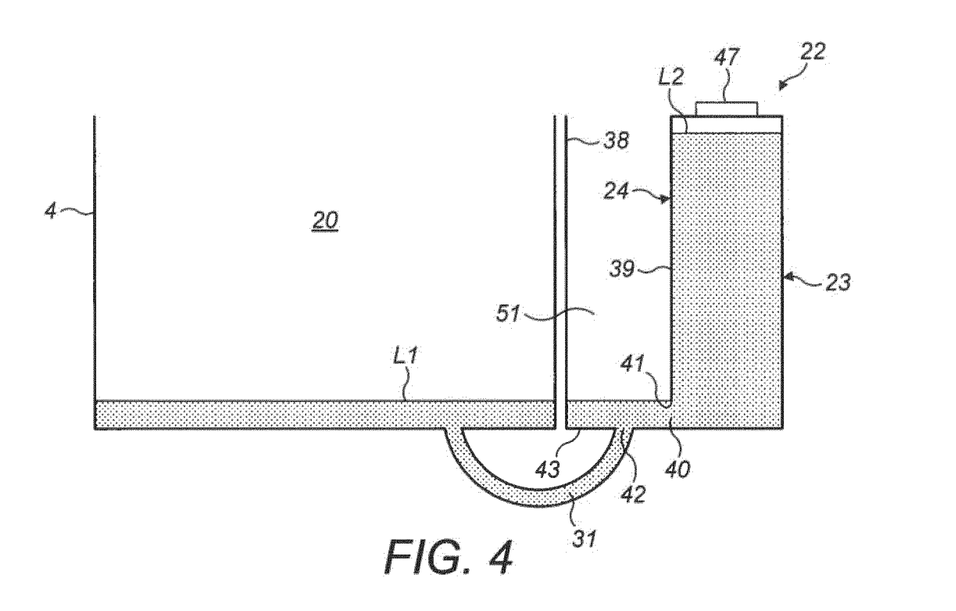
FIG. 4 shows a schematic water level controller according to a third embodiment of the invention.

Referring now to FIG. 4, a third embodiment of the invention is shown wherein like features retain the same reference numbers. In this embodiment the reservoir comprises a divider 39 to partition the reservoir 22 into the breather 24 and the tank 23 so that the breather 24 and the tank 23 form separate chambers within the reservoir 22. An opening 40 is provided in the divider 39 so that the tank 23 is in fluid communication with the breather 24. The breather 24 is open to atmosphere to define the air path into the tank 23.

A lower end 41 of the divider forms an upper edge 41 of the opening 40 between the tank 23 and the breather 24 which is coincident with the predetermined level L1, in other words it is coincident with the desired water level in the bottom of the cooking chamber 20.

The channel 31 connecting the reservoir 22 to the cooking chamber 20 connects to an opening 42 in a base wall 43 of the reservoir 22. Although in the illustrated embodiment the opening 42 is provided in the base wall 43 of the breather part 24 of the reservoir 22, functionality is not affected if it is instead provided in the base part of the tank 23. In either case, the channel 31 connects the reservoir 22 to the cooking chamber 20 below the predetermined level L1. A valve (not shown) may be provided at the opening 42 in the base 43 of the reservoir 22 to close the tank 23 off from the channel 31 to allow the tank 23 to be filled with water without the water passing through the channel 31 and into the cooking chamber 20.

Prior to heating the cooking chamber 20, it is filled with water to a first level that is below the predetermined level L1. The valve is then closed to prevent water travelling along the channel 31 and the tank 23 is filled to a level L2 higher than the predetermined level L1 via the opening in the top wall 29 so that it is full or as near as full as possible. It shall be appreciated that as the tank 23 is filled the breather 24 will also fill with water so that water in the breather 24 is at the same level as the water in the tank 23. For this reason the wall 38 of the breather extends to a level at least equal to the level to which the tank 23 is filled. The tank 23 is then sealed by screw cap 47 or bung as described above and the valve is then opened so that residual water in the breather 24 drains into the cooking chamber 20 through the channel 31 until the level of water in the breather 24 is the same as the level in the cooking chamber 20, which is the predetermined level L1. The predetermined level L1 is the same level as the upper edge 41 of the opening 40 in the tank 23 so that the air path into the tank 23 defined by the breather 24 is blocked by the presence of water. Other methods of priming the system ready for cooking are also envisaged.

In this embodiment, the volume of the breather 24 can be determined so that the residual water in the breather 24 equals the volume of water required to fill the cooking chamber 20 to the predetermined level L1. It shall be appreciated that this negates the requirement to first fill the cooking chamber 20 to a first level. For example, after the tank 23 has been filled and sealed, the valve can be opened and the residual water in the breather 24 is displaced into the cooking chamber 20 until the water level in the cooking chamber 20 and the breather 24 are equal, whereupon the water level is the predetermined level L1. To achieve this, the volume of the breather 24 above the predetermined level L1 must be equal to or greater than the volume of the cooking chamber 20 below the predetermined level L1.

During heating of the cooking chamber 20, the water is evaporated to steam and the water level drops below the predetermined level L1, the water level in the breather 24 drops to maintain hydrostatic equilibrium. This causes the water level to drop below the lower edge 41 of the opening 40 between the tank 23 and the breather 24 to define an air path into the tank 23. Air then bubbles up into the tank 23 through the opening 40 to displace water into the breather 24 and cooking chamber 20 until the water level is restored to the predetermined level L1 whereupon the water level is coincident or just above the lower edge 41 of the opening 40 to block the air path.

Figure 5:
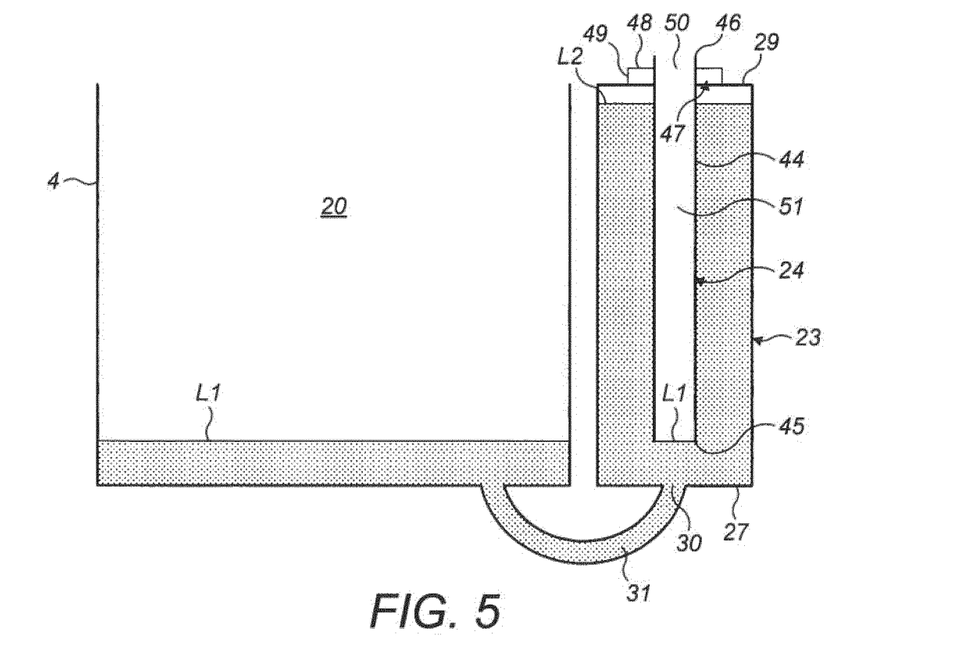
FIG. 5 shows a schematic water level controller according to a fourth embodiment of the invention.

Referring now to FIG. 5, a fourth embodiment of the invention is shown wherein like features retain the same reference numbers. In this embodiment the breather 24 is an open ended pipe 44 having a lower open end 45 received in the tank 23 at the predetermined level L1 and an upper open end 46 which is disposed outside of the tank 23 and is open to atmosphere. Therefore the water level in the breather 24 extends across the lower open end 45 of the pipe 44 when the water level in the breather 24 and the cooking chamber 20 is at the predetermined level L1. During heating of the cooking chamber 20 the water level drops below the predetermined level L1 which draws air into the tank 23 around the lower open end 45 of the breather 24 to displace water from the tank 23 into the cooking chamber 20 and restore the water level to the predetermined level L1. In other words, when the water level in the cooking chamber 20 drops below the predetermined level L1 air bubbles up into the tank 23 from the breather 24 until the water level in the cooking chamber 20 is restored to the predetermined level L1, whereupon the water level in the breather 24 again extends across the lower open end 45 to prevent further air from entering the tank 23.

The channel 31 extends between the tank 23 and the cooking chamber 20 as described above with reference to FIG. 3. A valve (not shown) is provided at the opening 30 in the tank 23 base 27 to close the tank 23 off from the channel 31 to allow the tank 23 to be filled with water without the water passing through the channel 31 and into the cooking chamber 20.

In the illustrated embodiment, the pipe 44 of the breather 24 is integral with a cap 47 provided to seal the tank 23 opening in the top wall 29. For example, the cap 47 is a screw cap that engages with a corresponding threaded section (not shown) around the opening to seal the tank 23. In such an example the screw cap 47 may comprise an upper face 48 which extends to enclose the opening when the cap 47 is received on the tank 23, and a wall 49 that extends around edges of the upper face 48. The wall 49 comprises a threaded inner face (not shown) configured to engage with a correspondingly threaded face (not shown) disposed around the tank 23 opening. As illustrated, pipe 44 of the breather 24 is integrally formed with the cap 47 extending through an opening 50 in the upper face 48.

Prior to heating the cooking chamber 20, it is filled with water to a first level that is below the predetermined level L1. The valve is then closed to prevent water travelling along the channel 31 and the tank 23 is filled to a level L2 higher than the predetermined level L1 via the opening in the top wall 29 so that it is full or as near as full as possible. The tank 23 is then sealed by the screw cap 47 during which the breather 24 is inserted into the tank 23 to define a space 51 within the tank 23 that is open to atmosphere. This causes the breather 24 to fill with water through the lower open end 45 so that the water level in the breather 24 and the tank 23 is the same. The valve is then opened so that residual water in the breather 24 drains into the cooking chamber 20 through the channel 31 until it is the same as the level in the cooking chamber 20, which is the predetermined level L1. The predetermined level L1 is coincident with the lower open end 45 of the breather 24 so that the air path into the tank 23 defined by the breather 24 is blocked by the presence of water.

Figure 6:
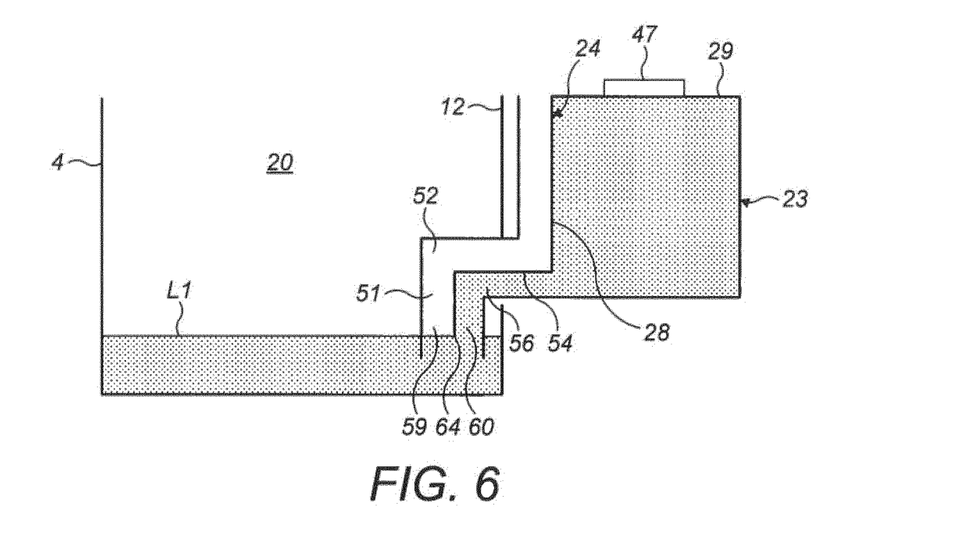
FIG. 6 shows a schematic water level controller according to a fifth embodiment of the invention.

Referring now to FIG. 6, a fifth embodiment of the invention is shown wherein like features retain the same reference numbers. In this embodiment the breather 24 consists of a first conduit 52 and the tank 23 comprises a second conduit 56 to fluidly connect the tank 23 to the cooking chamber 20. The first and second conduits 52, 56 extend into the cooking chamber 20 below the predetermined water level L1.

Specifically, the first and second conduits 52, 56 extend into the cooking chamber 20 along a common path, over which the conduits 52, 56 are separated by an intermediate wall 54. The conduits 52, 56 extend vertically down into the cooking chamber 20 to respective open ends 59, 60 disposed below the predetermined level L1. A lower end 64 of the intermediate wall 54 is disposed at the predetermined level L1 so that, during heating of the cooking chamber 20, when the water level drops below the predetermined level L1, air passes from the first conduit 52 into the second conduit 56 to displace water in the tank 23 into the cooking chamber 20. In other words, when the water in the cooking chamber 20 drops below the predetermined level L1, the water received in the opening 59 of the primary conduit 52 drops below the lower end 64 of the intermediate wall 54 to allow bubbles of air to travel along the second conduit 56 and into the tank 23, thereby displacing water into the cooking chamber 20.

A valve (not shown) may be provided in the second conduit 56 to close the tank 23 off from the second conduit 56 to allow the tank 23 to be filled with water without the water passing through the second conduit 56 and into the cooking chamber 20.

Prior to heating the cooking chamber, the valve is closed to prevent water travelling along the second conduit 56 and the tank 23 is filled via the opening in the top wall 29 so that it is full or as near as full as possible. The valve is then opened and a portion of the water in the tank 23 is allowed to pass through the second conduit 56 into the cooking chamber 20 until the water level in the cooking chamber 20 is at the predetermined level L1. The tank 23 is then sealed by screw cap 47 or bung as described above to prevent further water from passing out of the tank 23. With the tank 23 sealed, the water level L2 in the tank 23 is higher than the predetermined level L1.

In the above description, the invention has been explained in relation to one particular embodiment of a cooker, namely an air-frying cooker. However, the invention may equally advantageously be used with other cookers, in particularly cookers that use steam during the cooking process, such as for instance a steam oven, a multi cooker or a rice cooker. Typically, such a cooker may include a cooking chamber and a food receiving container in said cooking chamber having a permeable bottom wall. The cooker may further include a heater and possibly a fan. To generate steam, water may be added in the cooking chamber. Heating means may be provided to evaporate the water and create said steam. To maintain the water level in the cooking chamber as it is evaporated, new water may continuously be supplied to the cooker via one of the systems described above.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A cooker comprising:
    a cooking chamber;
    a food receiving container in the cooking chamber having a permeable bottom wall; and
    a system to maintain a predetermined level of water in the cooking chamber, the water being added to the cooker during cooking to create steam,
    wherein the predetermined level is disposed between a base of the cooking chamber and a bottom wall of the food container,
    wherein the cooker comprises a heater for heating air in the cooking chamber; and a fan for circulating a flow of hot air in the cooking chamber to cook the food and evaporate the water in the cooking chamber to generate the steam;
    wherein the system comprises:
    a reservoir including a tank and a screw cap sealing the corresponding threaded section around a top opening of the tank, the reservoir in fluid communication with the cooking chamber and configured to retain reservoir water at a higher level than the predetermined level by a vacuum pressure;
    an opening to the reservoir configured so that the air intermittently passes into the reservoir when the water level in the cooking chamber drops below the predetermined level to increase the vacuum pressure acting on the water in the reservoir and displace the water from the reservoir into the cooking chamber until the water level in the cooking chamber is restored to the predetermined level; and
    a channel extending from the opening in the tank to a corresponding opening in the base of the cooking chamber; and
    wherein the cooking chamber comprises:
        an upper enclosure internal to the outer housing and arranged around the fan;
        an outer pan positionable beneath the upper enclosure, wherein when the outer pan is disposed within the outer housing it is located beneath the upper enclosure such that said enclosure extends across upper edges of the wall of the outer pan to form said cooking chamber around which heated air is circulated during operation; and
        a sealing element disposed between the upper enclosure and the outer pan to form a seal between the upper enclosure and the outer pan when the outer pan is disposed beneath the upper enclosure, the sealing element being disposed along one of an upper edge of the wall of the outer pan or along a lower edge of the upper enclosure.

2. A cooker according to claim 1, wherein the opening to the reservoir is disposed in a wall of the cooking chamber at the predetermined level so that, when water in the cooking chamber drops below the predetermined level, air above the water in the cooking chamber passes into the reservoir through the opening to increase the vacuum pressure acting on the reservoir water in the reservoir and displace water from the reservoir into the cooking chamber until the water level in the cooking chamber is restored to the predetermined level.

3. A cooker according to claim 1, wherein said system to maintain a predetermined level of water comprises a reservoir that includes:
   a tank configured to retain the tank water at a level higher than the predetermined level due to the vacuum pressure acting on water contained in the tank,
   a breather in fluid communication with the tank, the breather configured to provide a space within the reservoir that is open to the atmosphere and further defines an air path into the tank that is blocked when the water in the space in the reservoir open to atmosphere is at the predetermined level, the breather comprising an open ended pipe extending into the cooking chamber to a location below the predetermined water level, the breather being shaped to allow air to pass from the pipe into the tank when the water level in the pipe drops below said predetermined water level,
   wherein the reservoir is in fluid communication with the cooking chamber below the predetermined level, and the cooking chamber and the breather are configured so that changes in the chamber water level in the cooking chamber are reflected in changes in a breather water level in the breather, and
   wherein the reservoir is adapted so that the air can pass through the opening into the tank from the breather when the chamber water level in the cooking chamber drops below the predetermined level to increase the tank water pressure acting on the tank water in the tank and displace the reservoir water from the reservoir into the cooking chamber until the chamber water level in the cooking chamber is restored to the predetermined level.

4. A cooker according to claim 3, wherein the breather is an open-ended pipe shaped so that air passes from the pipe into the tank when the breather water level in the pipe drops below said predetermined water level.

5. A cooker according to claim 3, wherein the reservoir comprises a divider to partition the reservoir into the breather and the tank.

6. A cooker according to claim 5, wherein the reservoir has a base wall and a lower end of the divider terminates above the base wall at the predetermined water level to provide said fluid communication between the breather and the tank.

7. A cooker according to claim 3, wherein the breather is a pipe having an open end, the pipe being received in the tank such that said open-end is at the predetermined level, and the breather water level in the breather extends across said open end when water level in the cooking chamber is at the predetermined level wherein, when the water level in the cooking chamber drops below said predetermined level, the air passes into the tank from said open end to displace water from the tank into the cooking chamber to restore the water level in the cooking chamber to the predetermined level.

8. A cooker according to claim 3, wherein the breather comprises a first conduit and the tank comprises a second conduit, the first and second conduits extending into the cooking chamber to a location below the predetermined water level, each of said first and second conduits being configured so that, when the water in the cooking chamber drops below the predetermined level, the air passes from the first conduit into the second conduit to displace the tank water from the tank into the cooking chamber via said second conduit.

9. A cooker according to claim 8, comprising an intermediate wall between the first and second conduits, wherein the intermediate wall terminates in the cooking chamber at the predetermined water level so that the air flows across the end of said intermediate wall from the first conduit into the second conduit when the water level in the cooking chamber drops below the predetermined water level.

10. A cooker according to claim 1 further comprising a duct to regulate the vacuum pressure in the cooking chamber.

11. A cooker according to claim 1, wherein the sealing element comprises a resilient flexible seal that is compressed between the upper enclosure and the outer pan when the outer pan is positioned beneath the upper enclosure.

12. A cooker according to claim 1 further comprising a sealing member to seal the tank above the water contained in the tank and thereby maintain the vacuum pressure acting on the water contained into the tank.

13. A cooker according to claim 1, wherein the cooker is configured so that the predetermined level is 0.1-1.5 cm from the base of the cooking chamber.

14. A cooker according to claim 1, wherein the cooker is an air-frying cooker.

15. A cooker according to claim 14, wherein the system is arranged to automatically and continuously maintain the predetermined level of water in the cooking chamber as the water is evaporated during cooking.

16. A cooker comprising:
   a cooking chamber;
   a food receiving container in the cooking chamber having a permeable bottom wall;
   a system to maintain a predetermined level of water in the cooking chamber, the water being added to the cooker during cooking to create steam,
   wherein the predetermined level is disposed between a base of the cooking chamber and a bottom wall of the food container,
   wherein the cooker comprises a heater for heating air in the cooking chamber; and a fan for circulating a flow of hot air in the cooking chamber to cook the food and evaporate the water in the cooking chamber to generate the steam;
wherein the system comprises:
   a) a reservoir including a tank and a screw cap sealing the corresponding threaded section around a top opening of the tank, the reservoir in fluid communication with the cooking chamber and configured to retain reservoir water at a higher level than the predetermined level by a vacuum pressure; wherein the tank is configured to retain the tank water at a level higher than the predetermined level due to the vacuum pressure acting on the water contained in the tank,
   b) a breather in fluid communication with the tank, the breather configured to provide a space within the reservoir that is open to the atmosphere and further defines an air path into the tank that is blocked when the water in the space in the reservoir open to atmosphere is at a predetermined water level, the breather comprising an open ended pipe extending into the cooking chamber to a location below the predetermined water level, the breather being shaped to allow air to pass from the pipe into the tank when the water level in the pipe drops below said predetermined water level;

wherein the reservoir is in fluid communication with the cooking chamber below the predetermined water level, and the cooking chamber and the breather are configured so that changes in the chamber water level in the cooking chamber are reflected in changes in a breather water level in the breather; and wherein the reservoir is adapted so that the air can pass through the opening into the tank from the breather when the chamber water level in the cooking chamber drops below the predetermined water level to increase the tank water pressure acting on the tank water in the tank and displace the reservoir water from the reservoir into the cooking chamber until the chamber water level in the cooking chamber is restored to the predetermined water level;

wherein an opening to the reservoir is configured so that the air intermittently passes into the reservoir when the water level in the cooking chamber drops below the predetermined water level to increase the vacuum pressure acting on the water in the reservoir and displace water from the reservoir into the cooking chamber until the water level in the cooking chamber is restored to the predetermined water level; and c) a channel extending from the opening in the tank to a corresponding opening in the base of the cooking chamber.

17. A cooker comprising:

a cooking chamber;

a food receiving container in the cooking chamber having a permeable bottom wall;

a system to maintain the predetermined water level in the cooking chamber, the water being added to the cooker during cooking to create steam, wherein the predetermined water level is disposed between a base of the cooking chamber and a bottom wall of the food container, wherein the cooker comprises a heater for heating air in the cooking chamber; and a fan for circulating a flow of hot air in the cooking chamber to cook the food and evaporate the water in the cooking chamber to generate the steam;

wherein the system comprises:

a reservoir including a tank and a screw cap sealing the corresponding threaded section around a top opening of the tank, the reservoir in fluid communication with the cooking chamber and configured to retain reservoir water at a higher level than the predetermined water level by a vacuum pressure;

an opening to the reservoir configured so that the air intermittently passes into the reservoir when the water level in the cooking chamber drops below the predetermined water level to increase the vacuum pressure acting on the water in the reservoir and displace the water from the reservoir into the cooking chamber until the water level in the cooking chamber is restored to the predetermined water level;

a channel extending from the opening in the tank to a corresponding opening in the base of the cooking chamber;

wherein the reservoir comprises a divider to partition the reservoir into the breather and the tank so that the breather and the tank form separate chambers within the reservoir;

wherein the reservoir has a base wall and a lower end of the divider terminates above the base wall at the predetermined water level to provide said fluid communication between the breather and the tank;

wherein the divider includes an opening so that the tank is in fluid communication with the breather; and wherein a lower end of the divider forms and upper edge of the opening between the tank and the breather which is coincident with the predetermined water level in the bottom of the cooking chamber.

* * * * *